UNITED STATES PATENT OFFICE.

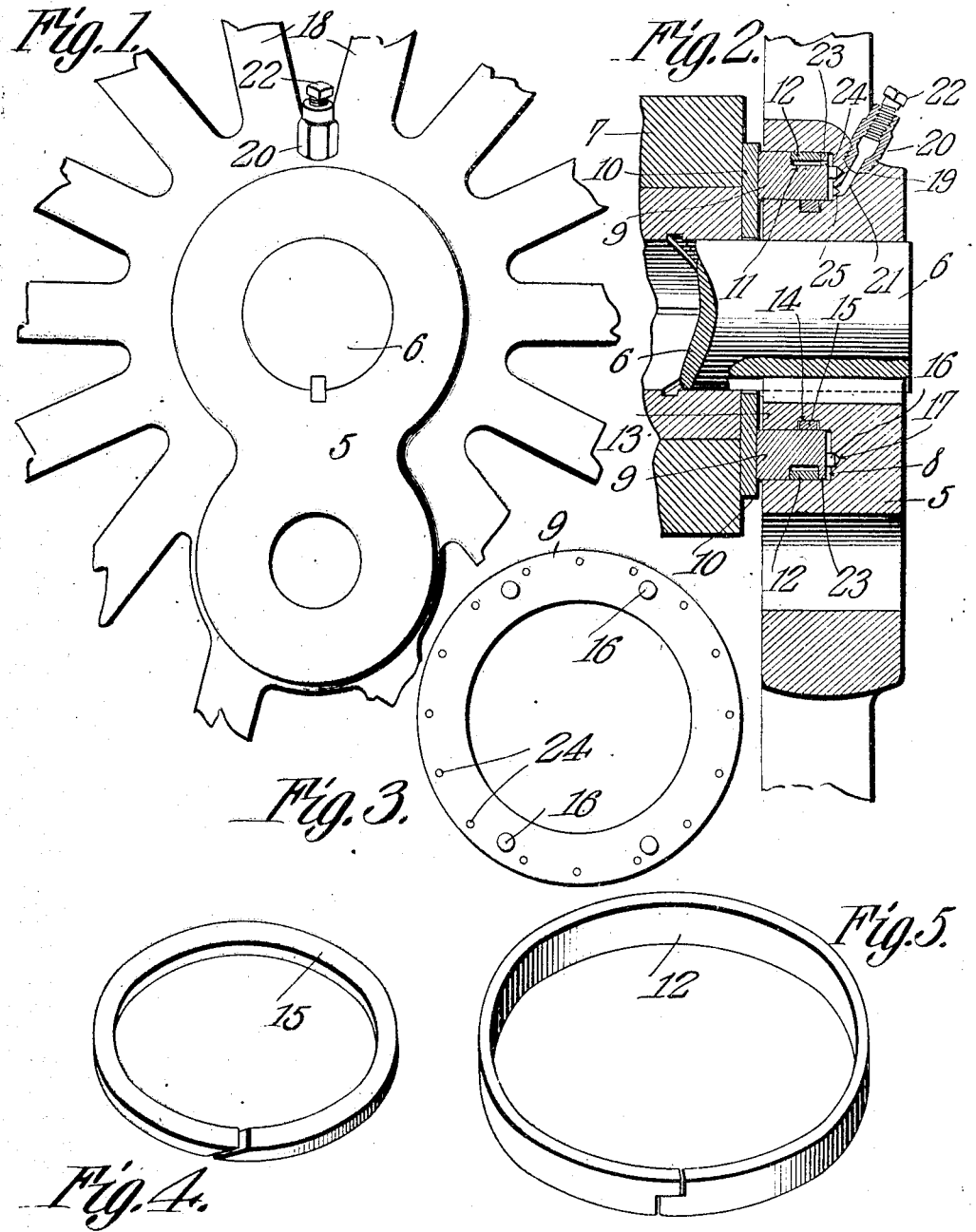

FREDRICK H. SMITH, OF PITTSBURG, KANSAS.

HUB-PLATE FOR LOCOMOTIVE DRIVING-WHEELS.

No. 920,094.  Specification of Letters Patent.  Patented April 27, 1909.

Application filed October 24, 1908. Serial No. 459,378.

*To all whom it may concern:*

Be it known that I, FREDRICK H. SMITH, a citizen of the United States, residing at Pittsburg, in the county of Crawford and State of Kansas, have invented a new and useful Hub-Plate for Locomotive Driving-Wheels, of which the following is a specification.

This invention relates to rail-way locomotives and more particularly to means for taking up any lateral or side play of the driving wheels of the locomotive incident to the passage of the latter over rough uneven rails.

The object of the invention is to provide an annular plate arranged to fit in the hub of the driving wheel and adapted to bear against the driving box or bearing thereby to prevent lateral play of said driving wheel.

A further object is to provide a hub plate or liner, the latter being movable into engagement with the driving box or bearing by the pressure of a lubricant introduced at the rear of said hub plate.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

In the accompanying drawings forming a part of this specification:—Figure 1 is a plan view of a portion of a locomotive driving wheel provided with a hub plate constructed in accordance with my invention. Fig. 2 is a longitudinal sectional view of the same. Fig. 3 is a plan view of the hub plate detached. Fig. 4 is a perspective view of one of the packing rings detached, and Fig. 5 is a similar view of the packing ring of the hub plate detached.

Similar numerals of reference indicate corresponding parts in all of the figures of the drawings.

The improved hub plate forming the subject matter of the present invention is principally designed for attachment to the driving wheel of a locomotive, and by way of illustration is shown in connection with such a driving wheel, in which 5 designates the wheel keyed on the shaft 6, and 7 the driving box or bearing which may be of the usual construction.

The inner face of the hub 5 is bored out to form an annular chamber 8 for the reception of the hub ring or liner 9, the outer face of said hub plate being extended laterally beyond the inner face of the hub for engagement with a bearing ring 10. The hub plate 9 is provided with an annular groove 11, in which is seated a split packing ring 12, which latter is designed to bear against the interior wall of the chamber 8 so as to insure a tight fit between the parts. The chamber 8 is disposed concentric with the axle 6 and is spaced from the latter to form an annular flange 13 having a groove 14 formed therein and in which is seated a packing ring 15, the latter being adapted to bear against the adjacent wall of the hub plate, as shown.

Extending laterally from the inner face of the hub plate 9 are a series of pins 16 arranged to enter correspondingly shaped sockets 17 formed in the rear wall of the chamber 8 so as to hold the hub plate stationary on the driving wheel and thus cause the hub plate to rotate with said driving wheel and axle 6.

Formed in the hub of the driving wheel between two of the adjacent spokes 18 is an opening 19, the walls of which are threaded for the reception of the correspondingly threaded end of a filling plug or tube 20, there being an aperture 21 in the hub of the driving wheel and forming a source of communication between the chamber 8 and the interior of the filling plug or receptacle 20 so as to permit the introduction of a quantity of grease or other lubricant at the rear of the hub plate. The grease or lubricant in the filling plug 20 is fed to the rear of the hub plate by a plunger 22 engaging the interiorly threaded walls of the member 20 so that by rotating said plunger, the lubricant within the tube will be forcibly ejected in the space between the rear face of the hub liner or plate 9 and the rear wall of the chamber 8, thereby to move said hub plate into engagement with the bearing ring 10 and thus take up any lateral side play of the driving wheel incident to the passage of the locomotive over rough uneven rails.

Attention is here called to the fact that the flange 23 formed by the seating groove 11 is provided with a plurality of relatively small perforations 24 through which the grease or other lubricant is fed to the rear of the expansible ring 12 so that when the plunger 22 is actuated to press the hub plate or liner against the bearing ring 10, a portion of the grease or lubricant from the tube 20 will pass through the apertures 24 and thus expand the ring 12 and assist in preventing independent movement of the hub plate relatively to the hub of the wheel.

An annular V shaped groove 25 is formed in the rear wall of the chamber 8, said annular groove intersecting the mouth of the passage 21 and serving to equally distribute the lubricant or grease on the rear wall of the chamber 8 and in position to lubricate the parts. It will thus be seen that when the plunger 22 is actuated the hub plate or ring 9 will bear against the bearing ring of the driving box, while the expansible ring 12 will frictionally engage the interior wall of the chamber 8, thereby not only taking up any wear or lateral play of the driving wheel, but also preventing accidental displacement of the hub plate relative to the driving wheel.

Having thus described the invention what is claimed is:—

1. The combination with a locomotive driving wheel having a seating chamber formed in the inner face thereof, of a bearing box, a hub plate seated in said chamber, and means for introducing a lubricant at the rear of the hub plate thereby to force the latter against the bearing box.

2. The combination with a locomotive driving wheel having an annular seating chamber formed in the inner face thereof and provided with an opening communicating with said chamber, of a bearing box, a hub plate seated in said chamber, and means for introducing a lubricant under pressure through said opening at the rear of the hub plate, thereby to force the latter in engagement with the bearing box.

3. The combination with a locomotive driving wheel having an annular seating chamber formed in the inner face thereof and provided with an opening communicating with said chamber, of a bearing box, a hub plate seated in said chamber, pins extending laterally from the hub plate and fitting in corresponding sockets in the hub of the drawing wheel, and means for introducing a lubricant under pressure through said opening at the rear of the hub plate for forcing the latter into engagement with the bearing box.

4. The combination with a locomotive driving wheel having an annular seating chamber formed in the inner face thereof and provided with an opening communicating with said chamber, of a hub plate seated in said chamber and provided with an expansible packing ring arranged to bear against the interior walls thereof, and a lubricant feeding device engaging the opening in the hub of the driving wheel for feeding lubricant under pressure to the rear of the hub plate.

5. The combination with a locomotive driving wheel and bearing box, of a hub plate seated in a chamber formed in the inner face of the hub of the driving wheel and having an annular groove formed therein and defining a perforated flange, a packing ring seated in said groove, means for introducing a lubricant under pressure at the rear of the hub plate for forcing the latter in engagement with the bearing box, a portion of the lubricant being adapted to enter through the apertures in the flange of the hub plate to the rear of the packing ring for expanding the latter.

6. The combination with a locomotive driving wheel having an annular seating chamber formed therein, the rear wall of which is provided with a groove, there being an opening formed in the hub of the wheel and communicating with said groove, a hub plate seated in the chamber, pins extending laterally from the hub plate and engaging corresponding sockets formed in the hub for spacing the hub plate from the rear wall of the chamber, a packing ring surrounding the hub plate and bearing against the adjacent interior wall of said chamber, a receptacle seated in the opening in the hub and adapted to contain a lubricant, and a plunger operating within the receptacle for forcing lubricant into the annular groove, a portion of the lubricant being adapted to pass through apertures in the hub plate to the rear of the packing ring.

In testimony that I claim the foregoing as my own, I have hereto affixed my signature in the presence of two witnesses.

FREDRICK H. SMITH.

Witnesses:
FRANK C. BATES,
MORRIS CLIGGITT.